(12) United States Patent
Muramatsu et al.

(10) Patent No.: US 10,093,176 B2
(45) Date of Patent: Oct. 9, 2018

(54) VEHICLE BODY REAR STRUCTURE

(71) Applicant: HONDA MOTOR CO., LTD., Minato-ku, Tokyo (JP)

(72) Inventors: Yuki Muramatsu, Wako (JP); Tsutomu Fukutomi, Wako (JP); Masahito Murota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 15/333,494

(22) Filed: Oct. 25, 2016

(65) Prior Publication Data

US 2017/0113541 A1  Apr. 27, 2017

(30) Foreign Application Priority Data

Oct. 27, 2015  (JP) ................. 2015-211323

(51) Int. Cl.
| | |
|---|---|
| *B60K 15/07* | (2006.01) |
| *B62D 21/02* | (2006.01) |
| *B62D 25/08* | (2006.01) |
| *B60K 15/063* | (2006.01) |
| *B62D 25/20* | (2006.01) |
| *B62D 21/03* | (2006.01) |
| *B60N 2/28* | (2006.01) |
| *B62D 21/15* | (2006.01) |

(52) U.S. Cl.
CPC ............ *B60K 15/063* (2013.01); *B60K 15/07* (2013.01); *B60N 2/289* (2013.01); *B62D 21/02* (2013.01); *B62D 21/03* (2013.01); *B62D 25/08* (2013.01); *B62D 25/2027* (2013.01); *B60G 2204/15* (2013.01); *B60K 2015/0634* (2013.01); *B62D 21/155* (2013.01)

(58) Field of Classification Search
CPC .... B60K 15/063; B60K 15/067; B60K 15/07; B60K 2015/0634; B62D 21/03; B62D 21/02; B62D 21/155; B62D 25/08; B62D 25/2027; B60N 2/289; B60G 2204/15
USPC .................. 296/204, 193.07, 193.08, 203.04
See application file for complete search history.

(56) References Cited

U.S. PATENT DOCUMENTS

| | | | |
|---|---|---|---|
| 7,178,861 B2* | 2/2007 | Yamada ................. | B62D 21/09 296/187.08 |
| 7,513,329 B2* | 4/2009 | Nakashima ............ | B60G 7/006 180/312 |
| 2002/0030378 A1* | 3/2002 | Takahashi ................ | B60N 2/28 296/63 |

(Continued)

FOREIGN PATENT DOCUMENTS

| | | |
|---|---|---|
| JP | 2003-002233 A | 1/2003 |
| JP | 2010-076671 A | 4/2010 |

*Primary Examiner* — Keith J Frisby
(74) *Attorney, Agent, or Firm* — Carrier Blackman & Associates, P.C.; Joseph P. Carrier; Jingli Wang

(57) ABSTRACT

A vehicle body rear structure includes a lower cross member joined to the lower surface of a rear floor panel, and an upper cross member joined to the upper surface of the rear floor panel along the lower cross member. The lower cross member forms a closed section together with the rear floor panel, and is connected to front mounting portions on both sides. The upper cross member forms a closed section together with the rear floor panel. A rear flange of the lower cross member and a front flange of the upper cross member are joined to be overlaid via the rear floor panel.

9 Claims, 7 Drawing Sheets

(56) References Cited

U.S. PATENT DOCUMENTS

| | | | | |
|---|---|---|---|---|
| 2008/0265556 A1* | 10/2008 | Kobayashi | ....... | B60K 15/03504 280/830 |
| 2009/0094968 A1* | 4/2009 | Ikegami | ............. | F01N 13/1822 60/310 |
| 2014/0368000 A1* | 12/2014 | Komiya | ................ | B62D 21/11 296/193.07 |

* cited by examiner

VEHICLE BODY REAR STRUCTURE

CROSS REFERENCE TO RELATED APPLICATIONS

This application claims priority to Japanese Patent Application No. 2015-211323 filed on Oct. 27, 2015, the entire contents of which are incorporated by reference herein.

BACKGROUND OF THE INVENTION

Field of the Invention

The present invention relates to a vehicle body rear structure including a vehicle accessory and a sub-frame below a floor panel.

Description of the Related Art

There is known a vehicle body rear structure in which a cross member is bridged over rear frames on both sides in a vehicle width direction, a sub-frame is provided to be connected to the cross member, and a rear suspension is supported by the sub-frame (for example, Japanese Patent Laid-Open No. 2003-2233).

By connecting the sub-frame to the cross member, it is possible to ensure the support rigidity of the rear suspension. Furthermore, the cross member can support a load input from the rear suspension to the sub-frame.

To increase the support rigidity of the rear suspension, it is necessary to increase the sectional area of the cross member. Thus, the cross member narrows a space where a vehicle accessory such as a fuel tank is arranged.

To solve this problem, a space may be ensured by increasing the vehicle height. However, an increase in vehicle height may decrease the maneuverability of the vehicle.

On the other hand, there is known a vehicle body rear structure in which a lower cross member is joined to the lower surface of a rear floor panel, an upper cross member is jointed to the upper surface of the rear floor panel, and the rear flange of the lower cross member and the front flange of the upper cross member are joined while being overlaid (for example, Japanese Patent Laid-Open No. 2010-76671).

By joining the rear flange of the lower cross member and the front flange of the upper cross member, it is possible to suppress the sectional area of the lower cross member to be small. This can increase a space below the rear floor panel without increasing the vehicle height, thereby arranging a vehicle accessory such as a fuel tank in the space.

However, in the vehicle body rear structure according to Japanese Patent Laid-Open No. 2010-76671, the lower cross member does not support a sub-frame. Thus, to ensure ride comfort, it is necessary to additionally include a cross member for supporting the sub-frame, resulting in an increase in vehicle weight.

Furthermore, since the sub-frame is not supported by the lower cross member, the support rigidity of the fuel tank is low, and it is thus difficult to suppress the generation of fuel flow noise (a so-called sloshing sound) caused by shaking of the fuel tank at the time of traveling.

SUMMARY OF THE INVENTION

The present invention has been made in consideration of the aforementioned problems, and realizes a vehicle body rear structure in which a vehicle accessory such as a fuel tank can be arranged below a floor panel without increasing the vehicle height and the support rigidity of a suspension can be increased.

In order to solve the aforementioned problems, the first aspect of the present invention provides a vehicle body rear structure including rear frames extending in a longitudinal direction of a vehicle body on both sides in a vehicle width direction, mounting portions respectively provided in lower portions of the rear frames, a sub-frame mounted on the mounting portions, a rear floor panel arranged between the rear frames above the sub-frame, and a vehicle accessory arranged below the rear floor panel, the structure comprising: a lower cross member connected to the mounting portions on both sides in the vehicle width direction while being joined to a lower surface of the rear floor panel, and configured to form a closed section together with the rear floor panel; and an upper cross member joined to an upper surface of the rear floor panel along the lower cross member, and configured to form a closed section together with the rear floor panel, wherein a flange portion of the lower cross member and a flange portion of the upper cross member are joined to be overlaid via the rear floor panel.

As described above, the lower cross member is jointed to the lower surface of the rear floor panel, and connected to the mounting portions on both sides in the vehicle width direction. In this state, the lower cross member and the rear floor panel form a closed section.

The upper cross member is joined to the upper surface of the rear floor panel along the lower cross member. In this state, the upper cross member and the rear floor panel form a closed section. Furthermore, the flange portions of the lower and upper cross members are overlaid via the rear floor panel, and the overlaid flange portions are joined.

Consequently, loads in the vehicle width direction which are input from the mounting portions on both sides in the vehicle width direction to the lower cross member can be efficiently transferred to the upper cross member via the flange portions, respectively. Thus, the input loads in the vehicle width direction can be supported by the respective cross members. This can ensure the rigidity against the input loads in the vehicle width direction, that is, the so-called support rigidity.

The lower cross member and the upper cross member support the loads in the vehicle width direction which are input from the mounting portions on both sides in the vehicle width direction to the lower cross member. Thus, the sectional area of the lower cross member can be suppressed to be small. With this arrangement, a space where a vehicle accessory (for example, a fuel tank) is arranged can be formed below the rear floor panel without increasing the vehicle height.

In the invention according to a second aspect of invention, preferably, the lower cross member and the upper cross member are arranged at different positions in the longitudinal direction of the vehicle body.

As described above, the lower cross member and the upper cross member are arranged at different positions in the longitudinal direction of the vehicle body. Thus, the lower cross member and the upper cross member can support a wide region of the rear floor panel in the longitudinal direction of the vehicle body. This can appropriately increase the rigidity of the rear floor panel, thereby increasing the ride comfort.

In the invention according to a third aspect of invention, preferably, the vehicle accessory is a fuel tank, and a valve is stored in an interior of the fuel tank, an upper portion of the valve is arranged below the upper cross member while projecting upward from an upper surface of the fuel tank, and a clearance is provided between the rear floor panel and the valve.

In this case, the lower cross member and the upper cross member are arranged at different positions in the longitudinal direction of the vehicle body (that is, staggered). Thus, it is possible to ensure a space between the rear floor panel and the fuel tank, and arrange the upper portion of the valve in this space. By arranging the upper portion of the valve using the space between the rear floor panel and the fuel tank in this way, the space can be effectively used.

In the invention according to a fourth aspect of invention, preferably, the upper portion of the valve is supported by a valve support portion on the upper surface of the fuel tank, the valve support portion is arranged above the lower surface of the lower cross member on a rear side of the vehicle body of the lower cross member, and the upper surface of the fuel tank includes an inclined portion extending upward from below the lower cross member to the valve support portion.

In this case, at the time of a frontal collision, the fuel tank moves to the front side of the vehicle body by an inertial force. To cope with this, the valve support portion is arranged above the lower surface of the lower cross member, and the inclined portion of the upper surface of the fuel tank extends upward from below the lower cross member to the valve support portion.

Consequently, when the fuel tank moves to the front side of the vehicle body by an inertial force, the inclined portion can be made to abut against the lower cross member. This can prevent the valve from abutting against the lower cross member, thereby preventing fuel leakage caused by damage to or breakage of the valve.

In the invention according to a fifth aspect of invention, preferably, the vehicle body rear structure further comprises a rear bulkhead uprising from the rear frames, both legs of the rear bulkhead are joined to the upper cross member to form the rear bulkhead and the upper cross member in an annular shape.

As described above, both the legs of the rear bulkhead are joined to the upper cross member to form the rear bulkhead and the upper cross member in an annular shape. The upper cross member is connected to the sub-frame via the lower cross member and the mounting portions.

Therefore, a load input from the sub-frame can be transferred to the lower cross member, the upper cross member, and the bulkhead. This allows the bulkhead to support the load input from the sub-frame, thereby increasing the ride comfort.

Furthermore, by supporting, by the bulkhead, the load input from the sub-frame, the sectional area of the lower cross member can be decreased, thereby ensuring a storage space for storing the fuel tank.

In the invention according to a sixth aspect of invention, preferably, the vehicle accessory is a fuel tank, and the fuel tank is made to abut against the lower cross member via a resin member.

As described above, the vehicle accessory is a fuel tank, and the fuel tank is made to abut against the lower cross member via the resin member. Thus, the lower cross member can appropriately support the fuel tank to increase the so-called support rigidity of the fuel tank.

This can suppress shaking of the fuel tank at the time of traveling, thereby suppressing the generation of fuel flow noise (a so-called sloshing sound) in the fuel tank.

In the invention according to a seventh aspect of invention, preferably, the vehicle body rear structure further comprises a seat support anchor mounted on the rear floor panel and configured to support a child safety seat, the seat support anchor includes a U-shaped mounting portion on which the child safety seat is mounted by bending a rod in an almost U shape, a mounting rod having a pair of free ends extending from the U-shaped mounting portion, and a floor fixing portion joined to the free ends of the mounting rod and fixed to the rear floor panel above the lower cross member.

To support the child safety seat, the seat support anchor is mounted on the rear floor panel. In consideration of the workability when the child safety seat is mounted on the seat support anchor, the seat support anchor preferably, largely extends toward the front side of the vehicle body to some extent.

If, however, the seat support anchor largely extends toward the front side of the vehicle body, contrivance to increase the mounting strength of the seat support anchor is required.

To achieve this, the floor fixing portion is fixed above the lower cross member. That is, the lower cross member can support the free ends of the mounting rod joined to the floor fixing portion. As a result, the mounting strength of the seat support anchor is increased, and the U-shaped mounting portion of the seat support anchor can largely extend toward the front side of the vehicle body to some extent. This improves the workability when the child safety seat is mounted on the U-shaped mounting portion of the seat support anchor.

In the invention according to a eighth aspect of invention, preferably, a bulkhead is provided in an interior of the lower cross member below the floor fixing portion.

That is, the strength of the lower cross member is increased by the bulkhead. Therefore, it is possible to firmly mount the floor fixing portion by the lower cross member, thereby further increasing the mounting strength of the seat support anchor.

With this arrangement, the U-shaped mounting portion of the seat support anchor can largely extend to some extent, thereby improving the mounting workability of the child safety seat.

In the invention according to a ninth aspect of invention, preferably, the floor fixing portion is fastened to the bulkhead by a fastening member.

Thus, the bulkhead can support the floor fixing portion. As a result, the lower cross member and the bulkhead can firmly support the floor fixing portion, thereby further increasing the mounting strength of the seat support anchor.

With this arrangement, the U-shaped mounting portion of the seat support anchor can largely extend to some extent, thereby improving the mounting workability of the child safety seat.

According to the present invention, it is possible to arrange the vehicle accessory such as the fuel tank below the floor panel without increasing the vehicle height by joining the flange portion of the lower cross member and that of the upper cross member while being overlaid.

Furthermore, it is possible to increase the support rigidity of the suspension by connecting the lower cross member to the mounting portions on both sides in the vehicle width direction.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

Figure 1:
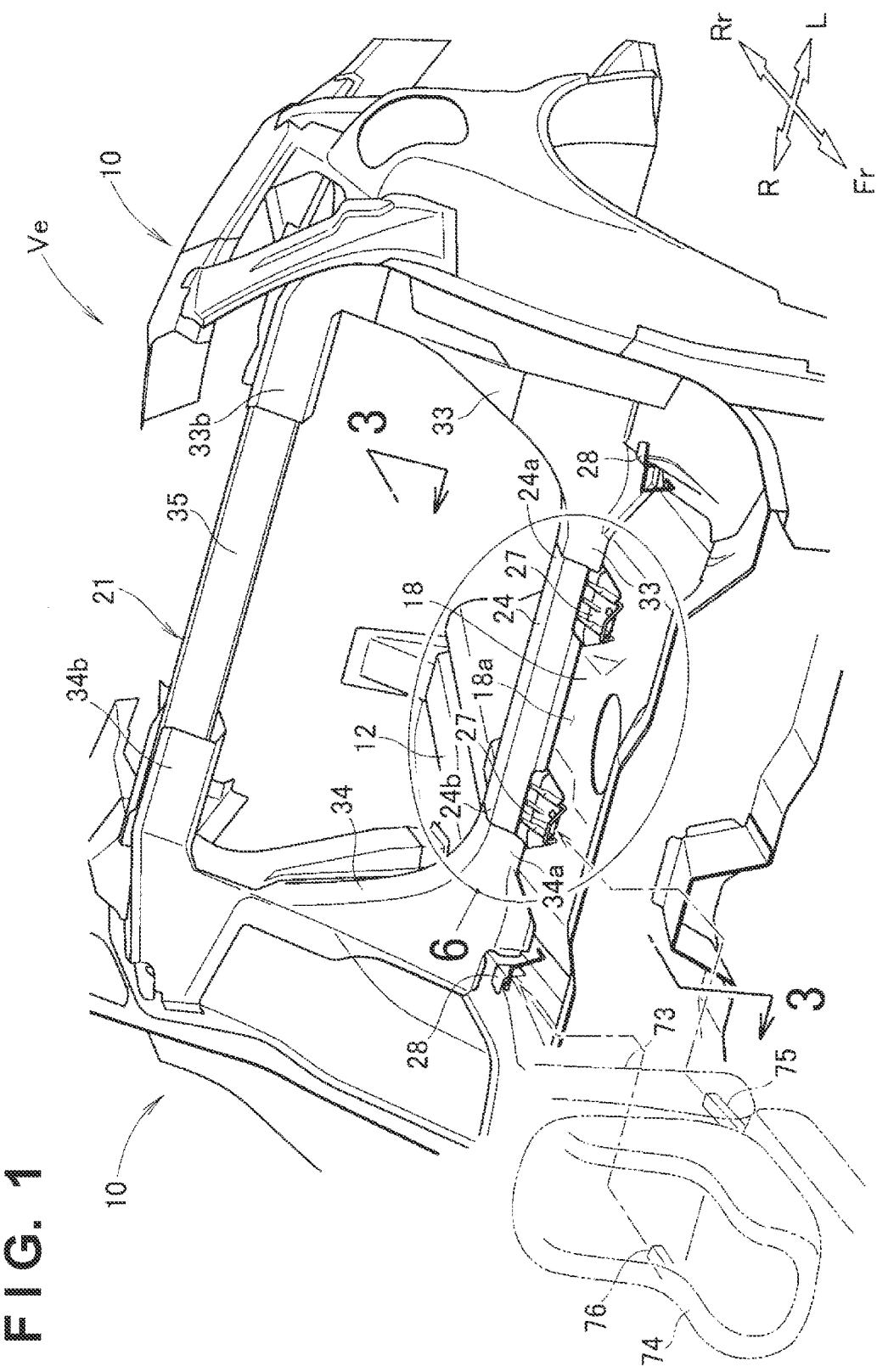
FIG. 1 is a perspective view showing a vehicle body rear structure according to the present invention.

The best mode for carrying out the present invention will be described below with reference to the accompanying drawings. Note that "front (Fr)", "rear (Rr)", "left (L)", and "right (R)" comply with directions viewed from a driver.

A vehicle body rear structure 10 according to an embodiment will be described.

Note that the vehicle body rear structure 10 has an almost bilaterally symmetrical structure. Therefore, left and right members of the vehicle body rear structure 10 are denoted by the same reference numeral, the left member will be described in detail, and a description of the right member will be omitted.

Figure 2:
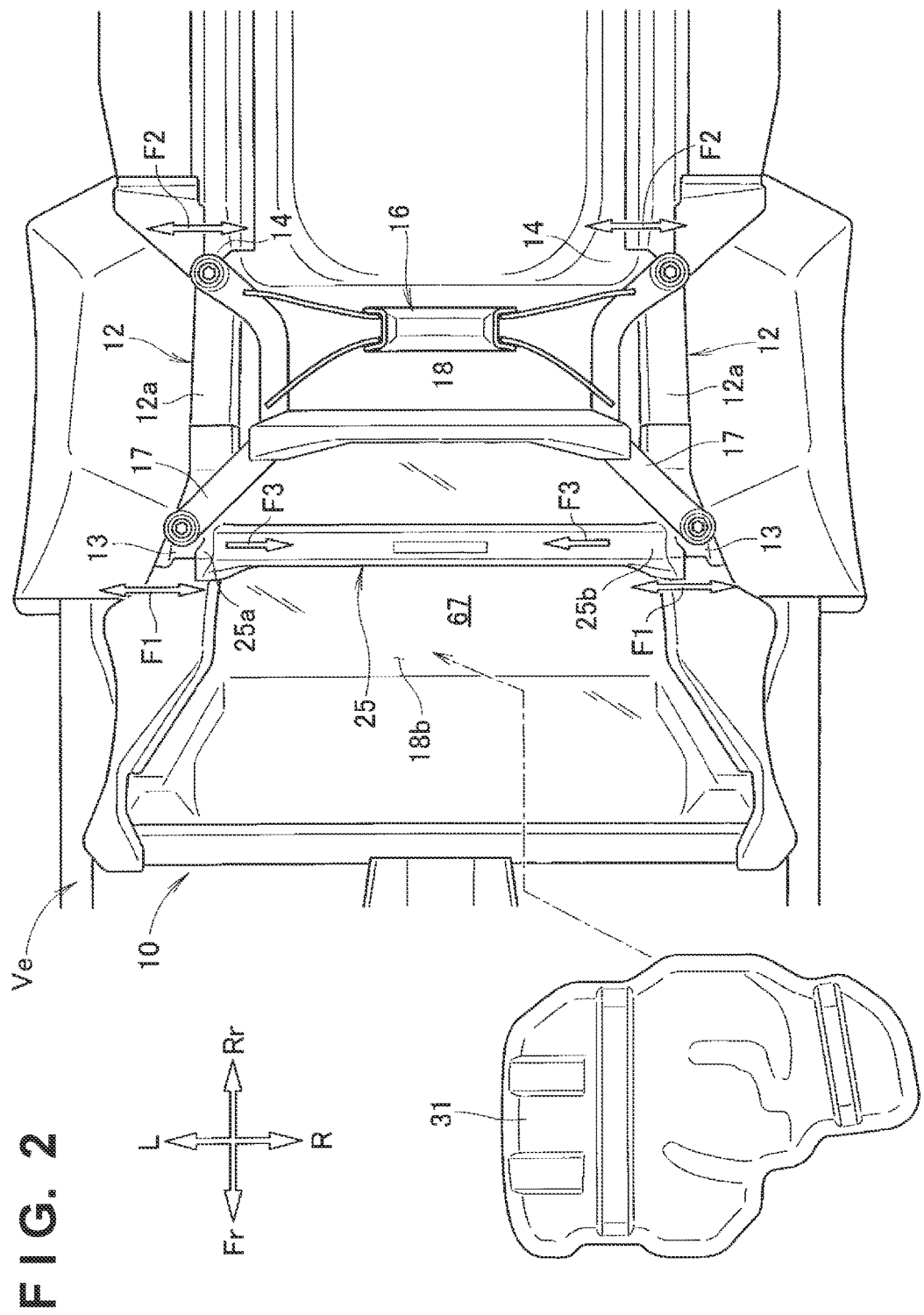
FIG. 2 is a bottom view showing the vehicle body rear structure shown in FIG. 1.

As shown in FIGS. 1 and 2, the vehicle body rear structure 10 includes rear frames 12 extending in the longitudinal direction of a vehicle body on both sides in the vehicle width direction, front mounting portions (mounting portions) 13 provided on the front sides of lower portions 12a of the respective rear frames 12, rear mounting portions (mounting portions) 14 provided on the rear sides of the lower portions 12a of the respective rear frames 12, a sub-frame 16 mounted on the front mounting portions 13 and the rear mounting portions 14, and a rear floor panel 18 arranged between the rear frames 12 above the sub-frame 16.

The vehicle body rear structure 10 includes a rear bulkhead (bulkhead) 21 uprising from the rear frames 12, an upper cross member 24 arranged in the rear bulkhead 21, a lower cross member 25 arranged below the rear floor panel 18, a plurality of seat support anchors 27 and 28 mounted on the rear floor panel 18, and a fuel tank (vehicle accessory) 31 arranged below the rear floor panel 18.

A rear suspension (not shown) is supported by both side frames 17 of the sub-frame 16. Thus, when the traveling direction of a vehicle Ve is changed or when the vehicle Ve turns, loads in the vehicle width direction are input to the sub-frame 16 via the rear suspension.

Therefore, loads F1 in the vehicle width direction act on the front mounting portions 13 on which the sub-frame 16 is mounted. Similarly, loads F2 in the vehicle width direction act on the rear mounting portions 14 on which the sub-frame 16 is mounted.

The upper cross member 24 extends in the vehicle width direction in the rear bulkhead 21, and is joined to an upper surface 18a of the rear floor panel 18. A left end 24a of the upper cross member 24 is connected to a lower end 33a of a left leg 33 of the rear bulkhead 21. A right end 24b of the upper cross member 24 is connected to a lower end 34a of a right leg 34 of the rear bulkhead 21.

Figure 3:
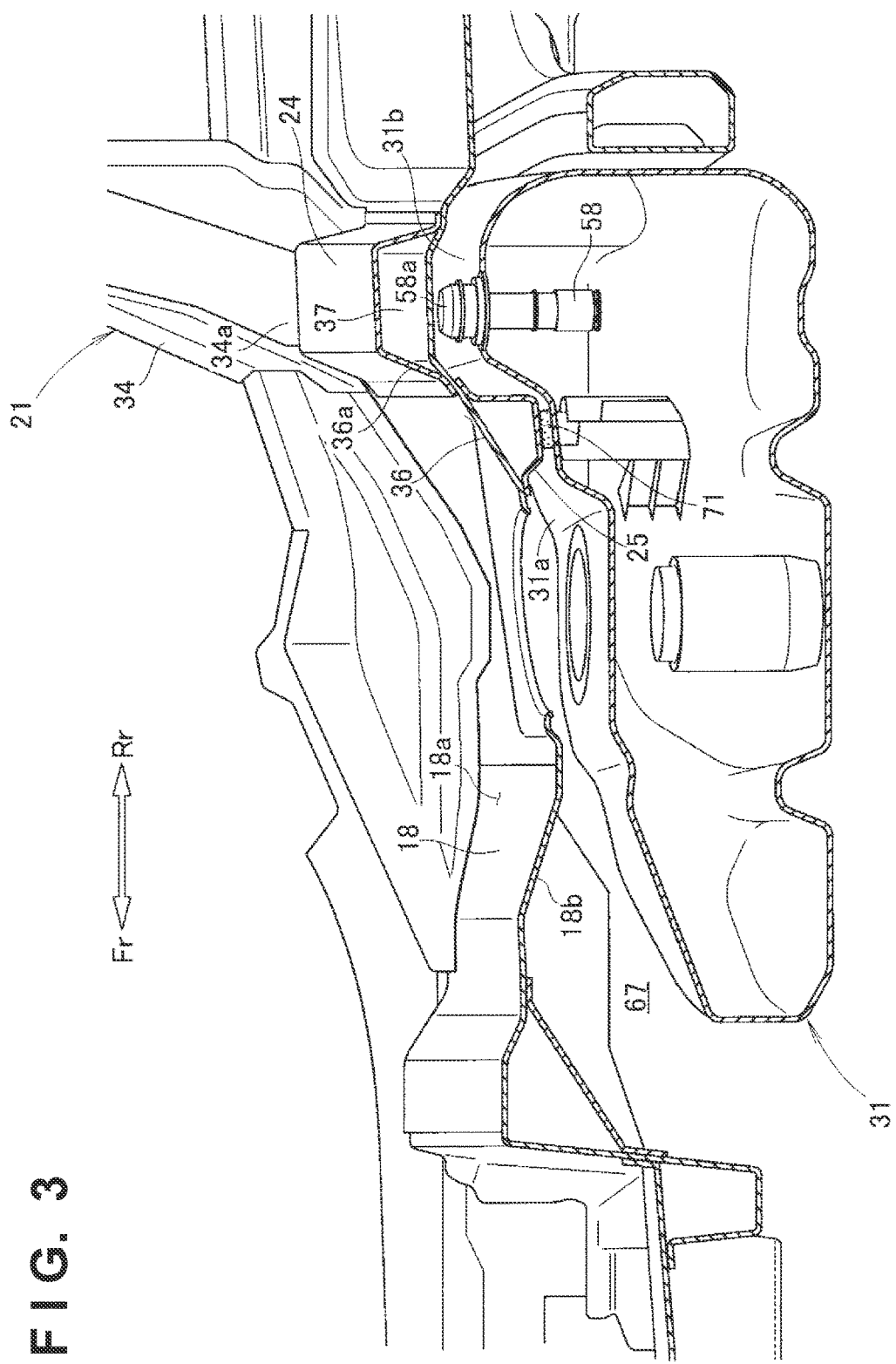
FIG. 3 is a sectional view taken along a line 3-3 in FIG. 1.

As shown in FIG. 3, the rear floor panel 18 is arranged above the fuel tank 31. The rear floor panel 18 includes an inclined floor portion 36 having an ascent from an upper center 31a of the fuel tank 31 in the longitudinal direction toward a rear upper portion 31b, and a flat floor portion 37 extending almost in the horizontal direction from an upper end 36a of the inclined floor portion 36 to the rear side of the vehicle body.

The upper cross member 24 is arranged above the flat floor portion 37.

Figure 4:
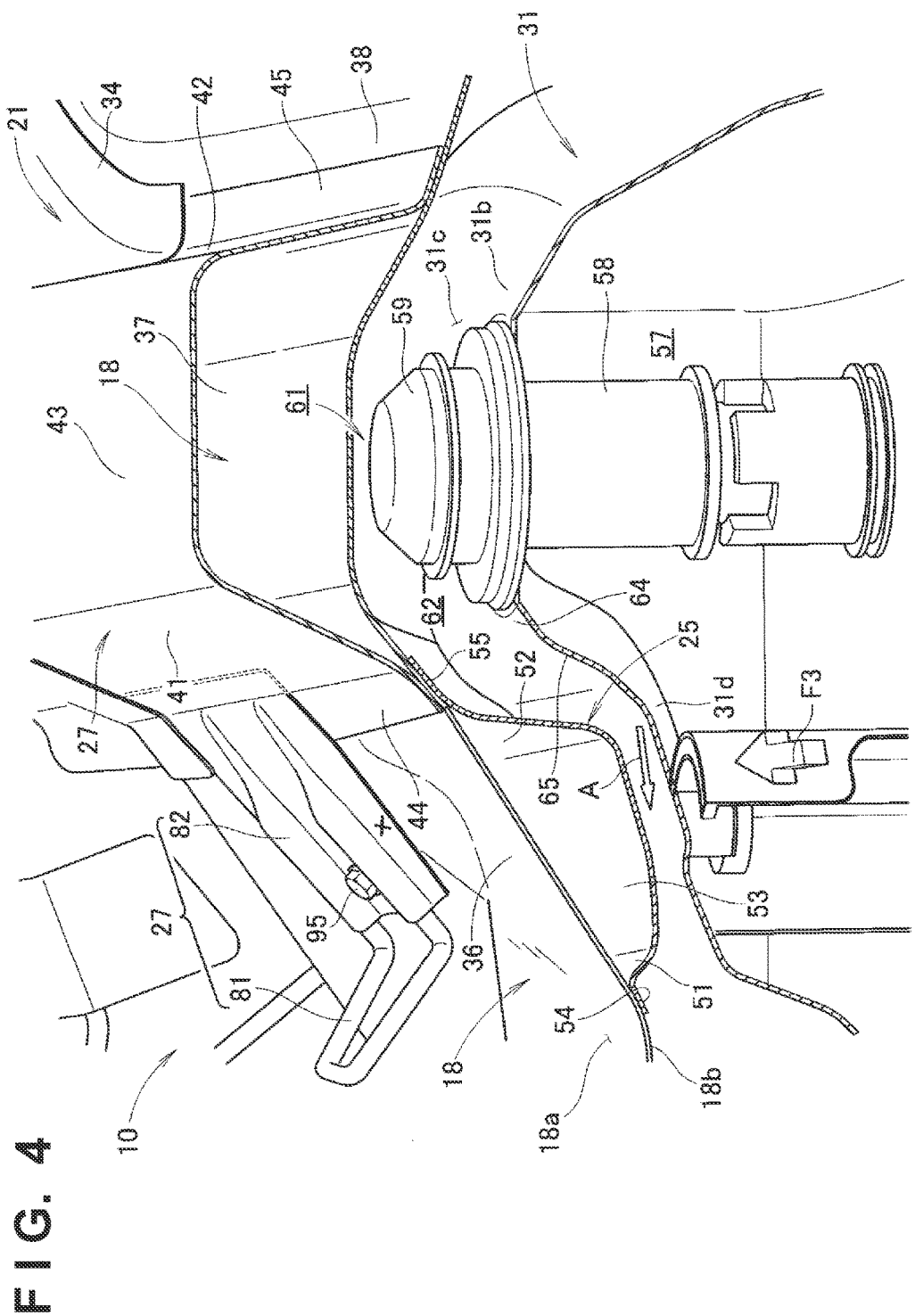
FIG. 4 is a sectional view taken along a line 4-4 in FIG. 6.

As shown in FIG. 4, the upper cross member 24 includes a front wall 41 arranged on the front side of the vehicle body, a rear wall 42 arranged on the rear side of the vehicle body, an upper portion 43 connecting the front wall 41 and the rear wall 42, a front flange (flange portion) 44 projecting from the lower end of the front wall 41, and a rear flange 45 projecting from the lower end of the rear wall 42.

The front wall 41, rear wall 42, and upper portion 43 form the upper cross member 24 to have an almost inverted U-shaped section.

The front flange 44 is joined to the inclined floor portion 36 from above. Furthermore, the rear flange 45 is joined, by the flat floor portion 37, to a floor portion 38 on the rear side of the vehicle body from above. This joins the upper cross member 24 to the rear floor panel 18 from above. In this state, the upper cross member 24 and the rear floor panel 18 (especially, the flat floor portion 37) form a closed section.

The lower cross member 25 is arranged along the upper cross member 24 on the front side of the vehicle body with respect to the upper cross member 24. The lower cross member 25 is joined to the inclined floor portion 36 of the rear floor panel 18 from below.

Referring back to FIG. 2, the lower cross member 25 extends in the vehicle width direction, and is bridged over the left rear frame 12 and the right rear frame 12. A left end 25a of the lower cross member 25 is connected to the front mounting portion 13 of the left rear frame 12. Furthermore, a right end 25b of the lower cross member 25 is connected to the front mounting portion 13 of the right rear frame 12.

Therefore, if the traveling direction of the vehicle Ve is changed or if the vehicle Ve turns, loads in the vehicle width direction which are input to the sub-frame 16 via the suspension are transferred, as loads F3, to the lower cross member 25 via the front mounting portions 13.

As shown in FIG. 4, the lower cross member 25 includes a front wall 51 arranged on the front side of the vehicle body, a rear wall 52 arranged on the rear side of the vehicle body, a lower portion 53 connecting the front wall 51 and the rear wall 52, a front flange 54 projecting from the upper end of the front wall 51, and a rear flange (flange portion) 55 projecting from the upper end of the rear wall 52.

The front wall 51, rear wall 52, and lower portion 53 form the lower cross member 25 to have an almost U-shaped section.

The front flange 54 is joined to the inclined floor portion 36 from below. Furthermore, the rear flange 55 is joined to the inclined floor portion 36 from below. This joins the lower cross member 25 to a lower surface 18b of the rear floor panel 18 from below. In this state, the lower cross member 25 and the rear floor panel 18 (especially, the inclined floor portion 36) form a closed section.

The upper cross member 24 extends along the lower cross member 25. In addition, the rear flange 55 of the lower cross member 25 and the front flange 44 of the upper cross member 24 are overlaid in the vertical direction. In this state, the rear flange 55 of the lower cross member 25 and the front flange 44 of the upper cross member 24 are joined to be overlaid via the inclined floor portion 36.

The upper cross member 24 and the lower cross member 25 are formed to have closed sections, respectively.

Consequently, the loads F3 in the vehicle width direction which are input from the front mounting portions 13 (see FIG. 2) on both sides in the vehicle width direction to the lower cross member 25 can be efficiently transferred to the upper cross member via the rear flange 55 of the lower cross member 25 and the front flange 44 of the upper cross member 24.

The lower cross member 25 and the upper cross member 24 can support the input loads F3 in the vehicle width direction, and the rigidity, that is, the so-called support rigidity of the vehicle body rear structure 10 against the loads F3 can be ensured.

Furthermore, when the lower cross member 25 and the upper cross member 24 support the loads F3 in the vehicle width direction which are input from the front mounting portions 13 (see FIG. 2) on both sides in the vehicle width direction to the lower cross member 25, the sectional area of the lower cross member 25 can be suppressed to be small.

With this arrangement, a space where the vehicle accessory such as the fuel tank 31 is arranged can be ensured without increasing the vehicle height, as in the conventional technique.

Furthermore, the lower cross member 25 is arranged on the front side of the vehicle body with respect to the upper cross member 24. That is, the lower cross member 25 and the upper cross member are arranged at different positions in the longitudinal direction of the vehicle body.

Therefore, the lower cross member 25 and the upper cross member 24 support a wide region (that is, the inclined floor portion 36 and the flat floor portion 37) of the rear floor panel 18 in the longitudinal direction of the vehicle body. This increases the rigidity of the rear floor panel 18, thereby increasing the ride comfort.

In the rear upper portion 31b of the fuel tank 31, a pressure regulating valve (valve) 58 is stored in an interior 57 of the fuel tank 31. The pressure regulating valve 58 regulates the pressure in the fuel tank 31. An upper portion 59 of the pressure regulating valve 58 projects upward from an upper surface 31c of the rear upper portion 31b. Furthermore, the projecting upper portion 59 is arranged below the upper cross member 24 (more specifically, below the flat floor portion 37).

The lower cross member 25 and the upper cross member 24 are arranged at different positions in the longitudinal direction of the vehicle body (that is, staggered). Therefore, the lower cross member 25 is arranged on the front side of the vehicle body with respect to the upper portion 59 of the pressure regulating valve 58.

With this arrangement, a space 62 is ensured between the flat floor portion 37 and the rear upper portion 31b of the fuel tank 31, and the upper portion 59 of the pressure regulating valve 58 is arranged in this space 62.

In this state, a clearance 61 is ensured between the flat floor portion 37 and the upper portion 59 of the pressure regulating valve 58. The space 62 can be effectively used by arranging the upper portion 59 of the pressure regulating valve 58 using the space 62 between the flat floor portion 37 and the rear upper portion 31b of the fuel tank 31.

While the upper portion 59 of the pressure regulating valve 58 projects upward from the upper surface 31c of the rear upper portion 31b, a valve support portion 64 on the upper surface 31c of the rear upper portion 31b supports the upper portion 59. The valve support portion 64 is arranged above the lower portion (lower surface) 53 of the lower cross member 25 on the rear side of the vehicle body of the lower cross member 25.

Furthermore, the upper surface 31c of the rear upper portion 31b includes an inclined portion 65 extending upward from a lower part 31d of the lower cross member 25 to the valve support portion 64.

At the time of a frontal collision, the fuel tank moves to the front side of the vehicle body by an inertial force. Thus, when the fuel tank 31 moves to the front side of the vehicle body by an inertial force, as indicated by an arrow A, the inclined portion 65 can be made to abut against the lower cross member 25.

This can prevent the upper portion 59 of the pressure regulating valve 58 from abutting against the lower cross member 25, thereby preventing fuel leakage caused by damage to or breakage of the upper portion 59 of the pressure regulating valve 58.

Referring back to FIGS. 1 and 2, the left leg 33 and right leg 34 of the rear bulkhead 21 are joined to the upper cross member 24. The rear bulkhead 21 includes the left leg 33 uprising from the left rear frame 12, the right leg 34 uprising from the right rear frame 12, and a connecting cross member 35 which connects an upper end 33b of the left leg 33 and an upper end 34b of the right leg 34.

The left leg 33, the right leg 34, and the connecting cross member 35 form the rear bulkhead 21 in an almost inverted U shape in a front view. Therefore, when the lower end 33a of the left leg 33 and the lower end 34a of the right leg 34 are connected to the upper cross member 24, the rear bulkhead 21 and the upper cross member 24 are formed in an annular shape in a front view.

The upper cross member 24 is connected to the sub-frame 16 via the rear floor panel 18, the lower cross member 25, and the front mounting portions 13.

Consequently, the loads F1 input from the sub-frame 16 to the front mounting portions 13 can be transferred (distributed) to the rear bulkhead 21 via the lower cross member and the upper cross member. Thus, the rear bulkhead 21 can support the loads F1 input from the sub-frame 16 to the front mounting portions 13, thereby further increasing the ride comfort.

By supporting, by the rear bulkhead 21, the loads F1 input from the sub-frame 16 to the front mounting portions 13, the sectional area of the lower cross member 25 can be decreased. This makes it possible to ensure a large storage space 67 (see FIG. 3 as well) below the rear floor panel 18, and store the fuel tank 31 in the storage space 67.

Figure 5:
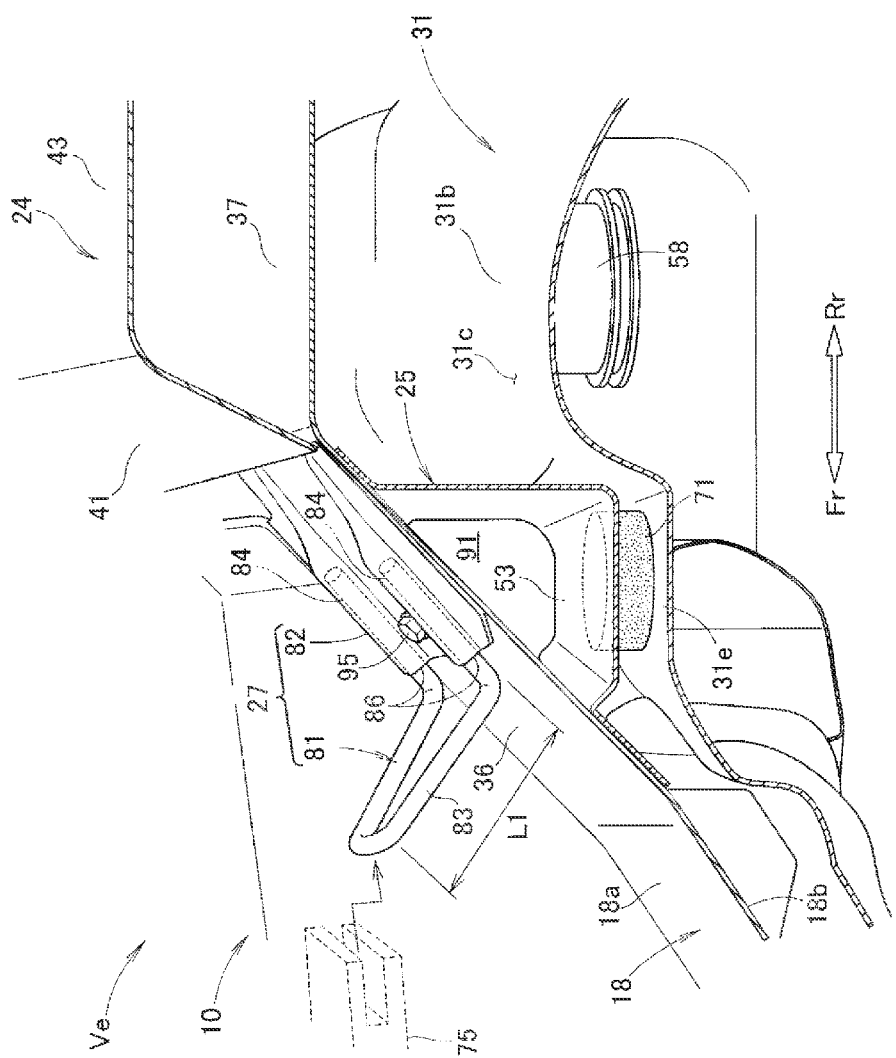
FIG. 5 is a sectional view taken along a line 5-5 in FIG. 6.

As shown in FIG. 5, a step portion 31e is formed on the upper surface 31c of the rear upper portion 31b of the fuel tank 31. A resin member 71 exists between the step portion 31e and the lower portion 53 of the lower cross member 25 while being elastically deformed (compressed). In other words, the step portion 31e on the upper surface 31c can be made to abut against the lower portion 53 of the lower cross member 25 via the resin member 71.

Thus, the lower cross member 25 appropriately supports the fuel tank 31 to increase the so-called support rigidity of the fuel tank 31. This can suppress shaking of the fuel tank 31 at the time of traveling of the vehicle Ve, thereby suppressing the generation of fuel flow noise (a so-called sloshing sound) in the fuel tank 31.

As shown in FIG. 1, the plurality of seat support anchors 27 and 28 are mounted on the rear floor panel 18. More specifically, the inner seat support anchors (seat support anchors) 27 are mounted to be adjacent to the upper cross member 24. The outer seat support anchors 28 are mounted to be adjacent to the left leg 33 and right leg 34 of the rear bulkhead 21.

While a child safety seat 74 is placed on a rear seat 73, an inner mounting portion 75 of the child safety seat 74 is mounted on the inner seat support anchor 27 on the right side in the vehicle width direction. An outer mounting portion 76 of the child safety seat 74 is mounted on the outer seat support anchor 28 on the right side in the vehicle width direction.

Thus, the inner seat support anchor 27 and the outer seat support anchor 28 on the right side in the vehicle width direction support the child safety seat 74.

Similarly, the inner seat support anchor 27 and the outer seat support anchor 28 on the left side in the vehicle width direction can support the child safety seat 74.

The inner seat support anchor 27 on the right side in the vehicle width direction will be described below with reference to FIGS. 5 to 7.

Figure 6:
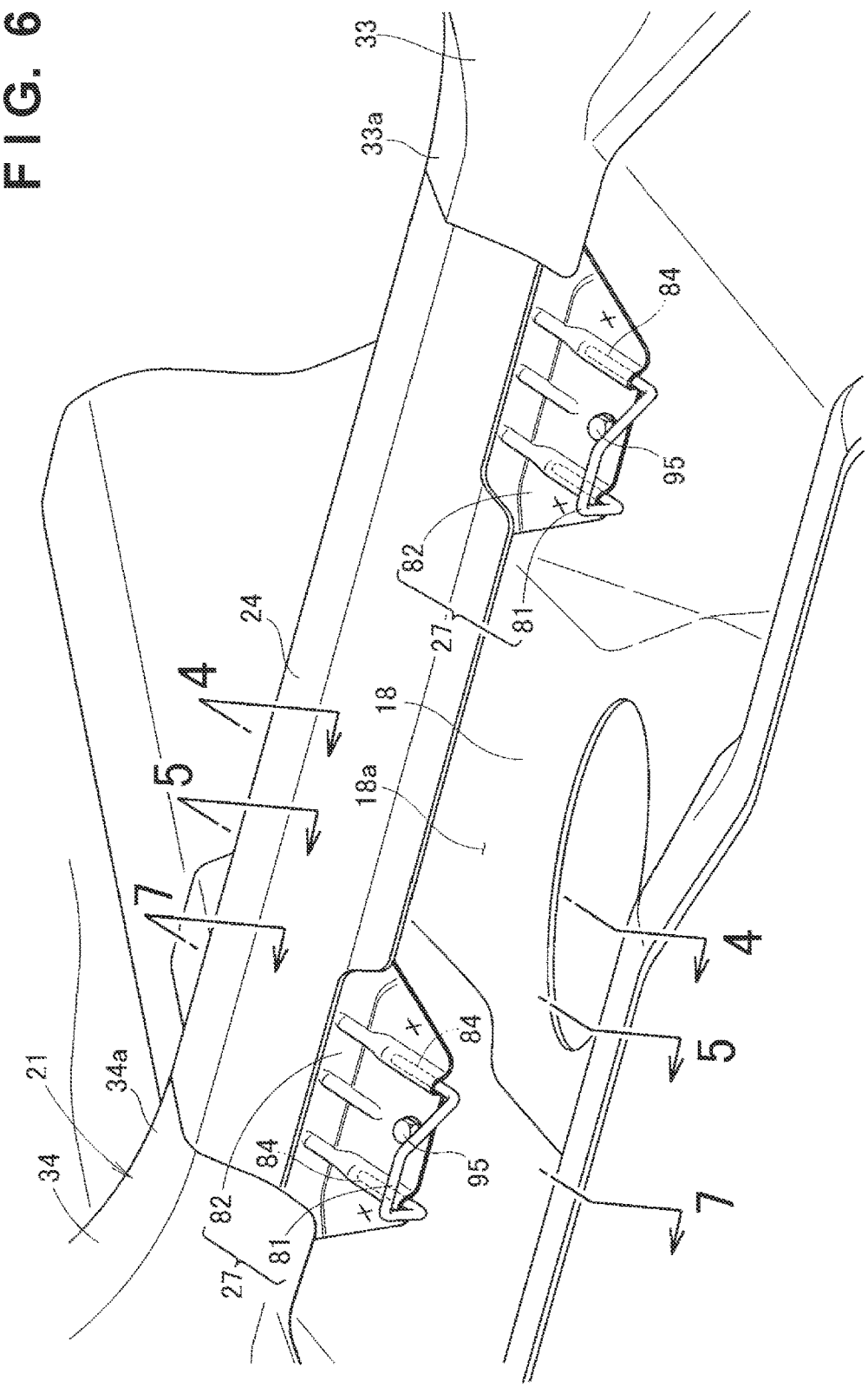
FIG. 6 is an enlarged view showing a portion 6 in FIG. 1.

As shown in FIGS. 5 and 6, the inner seat support anchor 27 includes a mounting rod 81 formed by bending a rod in an almost U shape, and a floor fixing portion 82 for mounting the mounting rod 81 on the inclined floor portion 36.

The mounting rod 81 includes a U-shaped mounting portion 83 on which the inner mounting portion 75 of the child safety seat 74 is mounted, and a pair of free ends 84 extending from the U-shaped mounting portion 83. The pair of free ends 84 are joined to mounting concave portions 86 (see FIG. 7 as well) of the floor fixing portion 82.

In this state, the floor fixing portion 82 is fixed to the inclined floor portion 36 above the lower cross member 25 by, for example, spot welding. That is, the pair of free ends 84 joined to the floor fixing portion 82 are firmly supported by the lower cross member 25.

Therefore, the mounting strength of the inner seat support anchor 27 can be increased, and thus the U-shaped mounting portion 83 of the inner seat support anchor 27 can largely extend toward the front side of the vehicle body to some extent. That is, a length dimension L1 of the U-shaped mounting portion 83 can be increased to some extent.

This can improve the workability when the inner mounting portion 75 of the child safety seat 74 (see FIG. 1) is mounted on the U-shaped mounting portion 83 of the inner seat support anchor 27.

Figure 7:
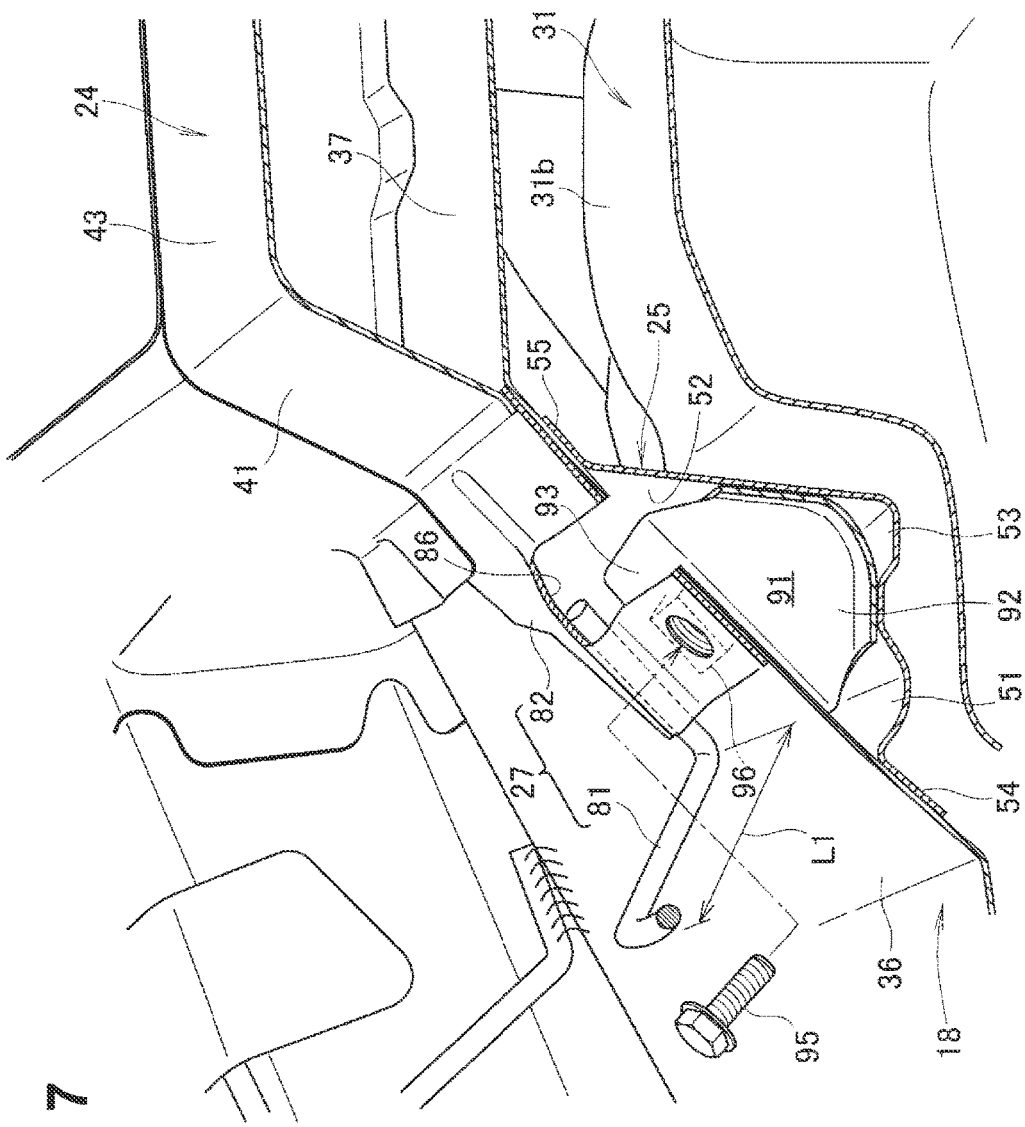
FIG. 7 is a sectional view taken along a line 7-7 in FIG. 6.

As shown in FIG. 7, a bulkhead 92 is provided in an interior 91 of the lower cross member 25 below the floor fixing portion 82. That is, the strength of the lower cross member 25 is increased by the bulkhead 92. Therefore, it is possible to firmly mount the floor fixing portion 82 by the lower cross member 25, thereby further increasing the mounting strength of the inner seat support anchor 27.

Furthermore, the floor fixing portion 82 is fastened to a flange 93 of the bulkhead 92 by a bolt (fastening member) 95 and a nut 96. That is, the bulkhead 92 can support the floor fixing portion 82. Therefore, the lower cross member 25 and the bulkhead 92 can firmly support the floor fixing portion 82, thereby further increasing the mounting strength of the inner seat support anchor 27.

This can reliably support the child safety seat 74 (see FIG. 1) by the inner seat support anchor 27 while the length dimension L1 of the U-shaped mounting portion 83 of the inner seat support anchor 27 is increased to some extent.

Note that the vehicle body rear structure according to the present invention is not limited to the above-described embodiment, and changes and improvements can be made appropriately.

For example, the bolt has been exemplified as the fastening member in the above embodiment. However, the present invention is not limited to this, and another fastening member such as a rivet can be used.

The shapes and arrangements of the vehicle body rear structure, the rear frames, the front and rear mounting portions, the sub-frame, the rear floor panel, the rear bulkhead, the upper cross member, the lower cross member, the inner sheet support anchors, the fuel tank, the pressure regulating valve, the valve support portion, the inclined portion, the resin member, the child safety seat, the mounting rod, the floor fixing potion, the U-shaped mounting portion, the free ends, and the bulkhead, all of which have been described in the above embodiment, are not limited to those exemplified above and can be changed appropriately.

The present invention can be suitably applied to an automobile including a vehicle body rear structure in which a vehicle accessory and a sub-frame are arranged below a floor panel and a suspension is supported by the sub-frame.

What is claimed is:

1. A vehicle body rear structure comprising:
rear frames extending in a longitudinal direction of a vehicle body on both sides in a vehicle width direction;
mounting portions respectively provided in lower portions of the rear frames;
a sub-frame mounted on the mounting portions;
a rear floor panel arranged between the rear frames above the sub-frame;
a vehicle accessory arranged below the rear floor panel;
a lower cross member connected to the mounting portions on both sides in the vehicle width direction while being joined to a lower surface of the rear floor panel, and configured to form a closed section together with the rear floor panel; and
an upper cross member joined to an upper surface of the rear floor panel along the lower cross member, and configured to form a closed section together with the rear floor panel,
wherein the lower cross member and the upper cross member are arranged at different positions in the longitudinal direction of the vehicle body, and
a rear flange portion of the lower cross member and a front flange portion of the upper cross member are joined to be overlaid via the rear floor panel.

2. The structure according to claim 1, wherein
the vehicle accessory is a fuel tank, and a valve is stored in an interior of the fuel tank,
an upper portion of the valve is arranged below the upper cross member while projecting upward from an upper surface of the fuel tank, and
a clearance is provided between the rear floor panel and the valve.

3. The structure according to claim 2, wherein
the upper portion of the valve is supported by a valve support portion on the upper surface of the fuel tank,
the valve support portion is arranged above the lower surface of the lower cross member on a rear side of the vehicle body of the lower cross member, and
the upper surface of the fuel tank includes an inclined portion extending upward from below the lower cross member to the valve support portion.

4. The structure according to claim 1, further comprising:
a rear bulkhead uprising from the rear frames,
wherein both legs of the rear bulkhead are joined to the upper cross member to form the rear bulkhead and the upper cross member in an annular shape.

5. The structure according to claim 1, wherein the vehicle accessory is a fuel tank, and a resin member is arranged between the fuel tank and the lower cross member.

6. The structure according to claim 1, further comprising:
a seat support anchor mounted on the rear floor panel and configured to support a child safety seat,
wherein the seat support anchor includes
a U-shaped mounting portion on which the child safety seat is mounted by bending a rod in an almost U shape,
a mounting rod having a pair of free ends extending from the U-shaped mounting portion, and
a floor fixing portion joined to the free ends of the mounting rod and fixed to the rear floor panel above the lower cross member.

7. The structure according to claim 6, wherein a bulkhead is provided in an interior of the lower cross member below the floor fixing portion.

8. The structure according to claim 7, wherein the floor fixing portion is fastened to the bulkhead by a fastening member.

9. The structure according to claim 1, wherein only the rear flange portion of the lower cross member and the front flange portion of the upper cross member are joined to be overlaid via the rear floor panel.

* * * * *